United States Patent [19]
Croan

[11] 3,840,925
[45] Oct. 15, 1974

[54] METHOD OF RECOVERING HONEY FROM ARTIFICIAL HONEYCOMBS

[76] Inventor: Kenneth F. Croan, 2165 N. Grand Oak, Altadena, Calif. 91001

[22] Filed: Feb. 26, 1973

[21] Appl. No.: 335,777

Related U.S. Application Data

[62] Division of Ser. No. 107,950, Jan. 20, 1971, Pat. No. 3,758,896.

[52] U.S. Cl. .................................... 6/2 R, 6/10
[51] Int. Cl. .......................................... A01k 47/00
[58] Field of Search........ 6/10, 12 A, 2, 12 R, 12 M

[56] References Cited
UNITED STATES PATENTS
3,088,135  5/1963  Covington............................ 6/10
3,619,828  11/1971  Ogilby................................ 6/12 A

OTHER PUBLICATIONS

"ABC And XYZ of Bee Culture," p. 262-280, March 1970, by root.

Primary Examiner—Hugh R. Chamblee
Assistant Examiner—J. Q. Lever
Attorney, Agent, or Firm—Sellers and Brace

[57] ABSTRACT

A method of collecting and recovering honey from bees by equipping a beehive super with closely spaced artificial honeycombs while being filled with honey and thereafter recovering the honey by centrifuging the preheated honey-laden supers thereby obviating the need for handling the individual honeycombs.

5 Claims, 9 Drawing Figures

PATENTED OCT 15 1974　　　　　3,840,925
SHEET 1 OF 2
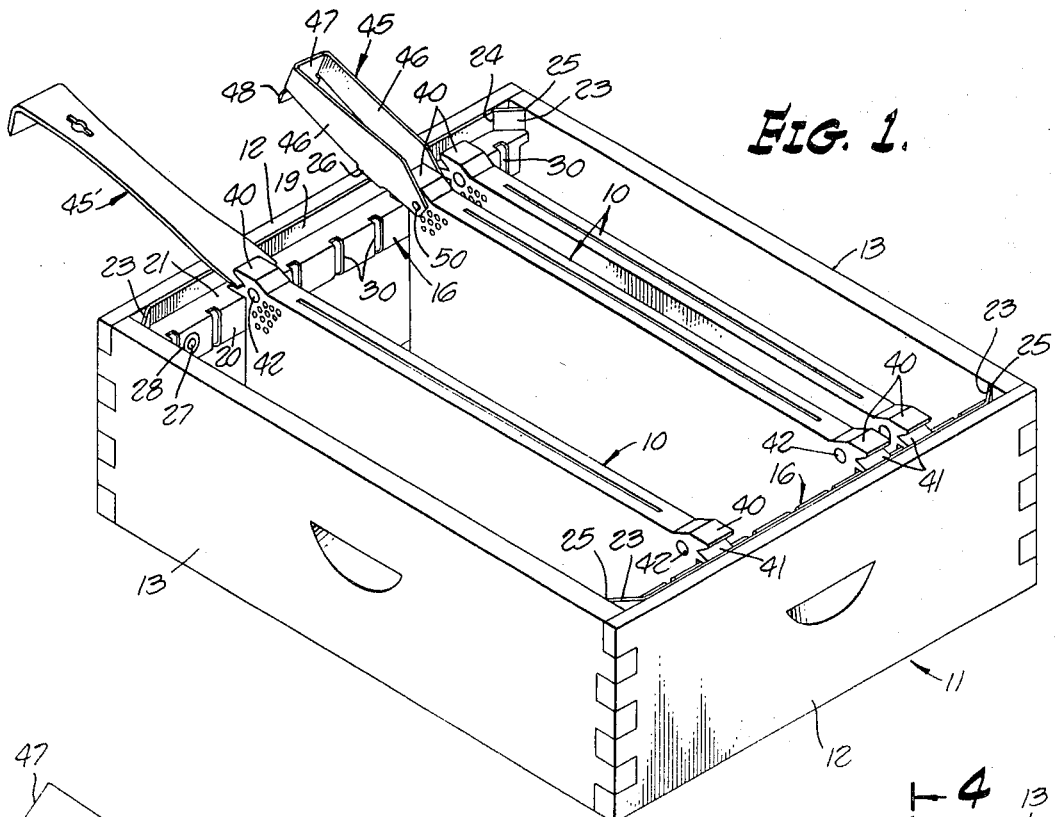
FIG. 1.
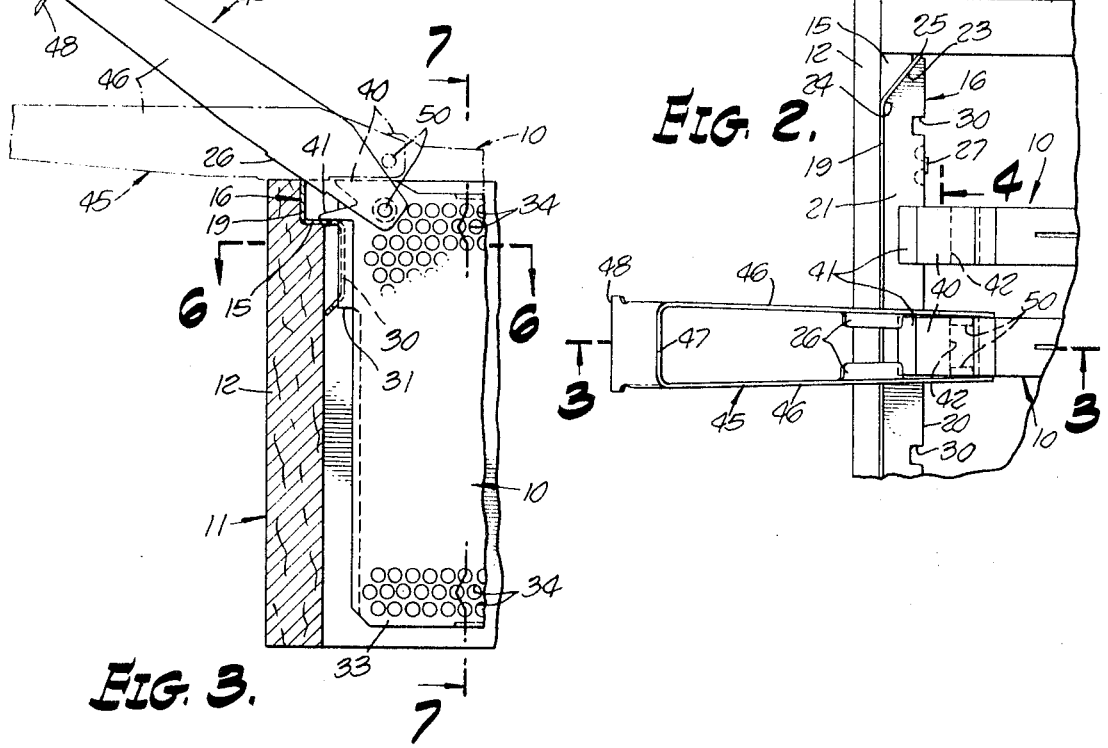
FIG. 2.
FIG. 3.

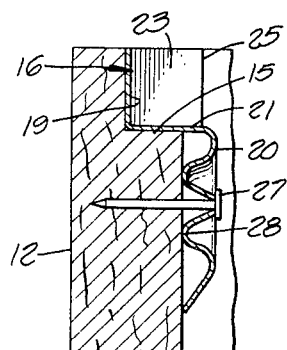
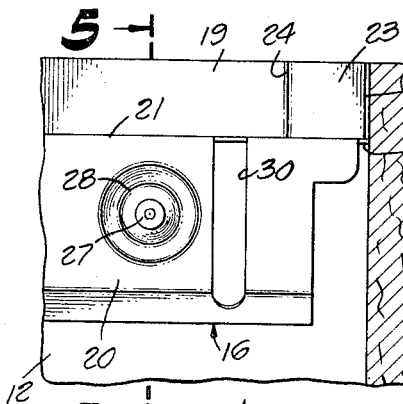
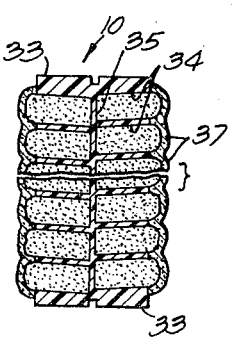
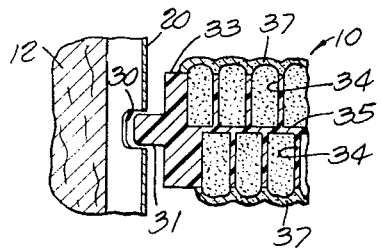
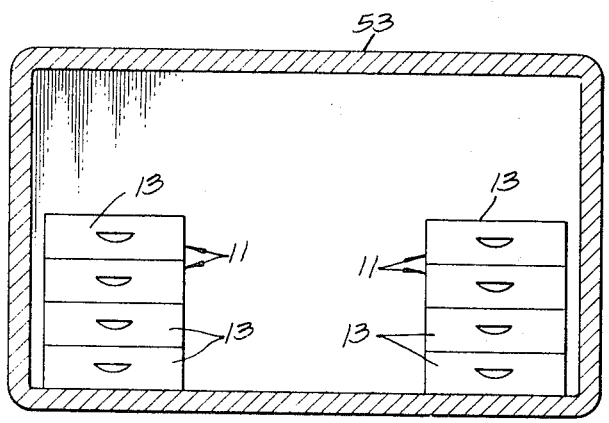
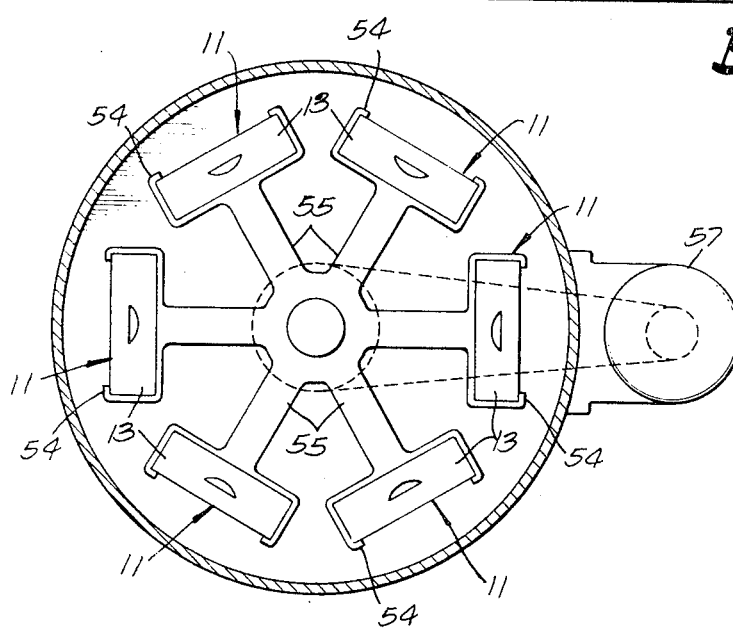

METHOD OF RECOVERING HONEY FROM ARTIFICIAL HONEYCOMBS

This application is a division of my copending application for U.S. Letters Pat. Ser. No. 107,950, filed Jan. 20, 1971, now U.S. Pat. No. 3,758,896 and entitled Artificial Honeycomb and Method of Collecting and Recovering Honey.

This invention relates to honey collection and recovery and more particularly to an improved high-efficiency low-cost artificial honeycomb and to means for manipulating and supporting the same in a conventional beehive super and to a method of collecting and recovering honey using such an artificial comb.

It has long been conventional practice to collect honey in beehives comprising one or more supers having provision therein for supporting a conventional rectangular wooden frame capable of holding about six pounds of honey. In the above described wood frame, it is necessary to hand mount a wire reinforced foundation wax sheet, a costly and time consuming operation. After the prepared frames have been installed in the beehive, the bees must expend considerable time and energy in building the wax cell walls before honey can be deposited. Various proposals have been made heretofore to overcome these and other shortcomings of prior practices but these attempts have been far from satisfactory and are subject to numerous shortcomings avoided by the present invention.

To this end this invention provides a greatly improved reusable honeycomb having preformed cells and numerous other unique features and advantages not heretofore available. The new comb can be manufactured from strong, rigid, durable, lightweight plastic material readily cleaned and sterilized for repeated use. The frame and comb combination extends from end to end of the super compartment and its opposite faces are substantially fully covered with a multiplicity of wells having the same approximate configuration as natural honeycomb cells. The depth of the individual wells may vary but in a preferred embodiment are equal to three quarters of the depth of natural honey cells with the result that the bees may expend a maximum of their time collecting and depositing honey, the only wax making operation being that required to complete the cell and cap the individual wells as filled. It is important that the well axes be acutely inclined upwardly from the horizontal similarly to the inclination of natural honey cells.

Owing to the characteristics and strength of the constituent material, substantially the full face area of each comb may be perforated and utilized to store honey. The conventional wood frame and wax foundation requires much of its surface area for structural strength. Because of the inherent strength of the plastic material of the invention comb, the well area has been extended to a 20 percent greater area than is possible with the wooden frame. Each comb is molded with lugs projecting from its upper corners each notched and recessed to permit use of a standard hive servicing tool of either conventional but preferably the novel form provided by this invention. This hive tool includes tong legs at one end for gripping and seating in recesses opening through the lugs of the comb. The opposite end of the tool includes a sharp-edged scraper section usable in scraping wax and the like encrusted matter from the hive surfaces.

The combs are held spaced from one another on the rabbeted ends of the supers using a readily inserted self-clamping spacer strip and cooperating with tongue means on the combs to hold the combs properly spaced apart and vertical. Spring tangs at the opposite ends of this strip press against the super sidewalls previously constructed for use with the now out-moded wooden frames. Owing to the thinness of the spacer strips, the supers are convertible to use with either type of honey frame.

The flat faces of the invention comb make it a simple matter to use these surfaces to guide a cutting blade to uncap the cells if this method is preferred over the high speed centrifugal method. Alternatively, and according to another mode of use made possible by this invention, the cells need not be uncapped. Thus either the honeycombs themselves, or supers along with all the honey charged combs still in place therein may be placed directly in centrifuge equipment. The charged combs are preheated, either before or after being placed in the centrifuge, to a temperature softening the wax and enabling the centrifuge action to extract all honey from the cells. This technique is not possible when using wood frames with wax cells since the wax cell walls will soften and collapse.

It will therefore be recognized that the invention greatly simplifies and minimizes the cost of processing beehives to collect honey. All phases of the complete operation are characterized by improvements in design, lower cost, greater efficiency, less labor, and increases the hive capacity substantially. Additionally the extraction of the honey is greatly simplified, costly repair work is avoided and far less storage area is required for the individual frames or combs.

It is therefore a primary object of the present invention to provide improved unique accessories and a novel method for collecting and recovering honey.

Another object of the invention is the provision of an improved method for collecting honey in individual hive supers and in extracting the honey without need for removing the combs from the supers.

Another object of the invention is the provision of a simple, one-piece, hand-held hive tool with portions designed to cooperate with the invention honeycomb and usable in different ways to perform different operations with an artificial comb.

Another object of the invention is the provision of a hive tool for handling the comb and formed with prying and scraping means at its opposite ends.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of a typical beehive super showing several components of the invention in their installed operating relationships to one another;

FIG. 2 is a fragmentary top plan view of the upper left hand corner of FIG. 1 but with the tong end of the hive tool gripping a comb in readiness to lift the comb from the super;

FIG. 3 is a cross-sectional view taken in part along line 3—3 on FIG. 2;

FIG. 4 is a view on an enlarged scale taken along line 4—4 on FIG. 2;

FIG. 5 is a fragmentary view taken along line 5—5 on FIG. 4;

FIG. 6 is a fragmentary cross-sectional view taken along line 6—6 on FIG. 3;

FIG. 7 is a fragmentary cross-sectional view taken along line 7—7 on FIG. 3;

FIG. 8 is a generally diagramatic view showing a plurality of honey-filled supers in a hot room; and FIG. 9 is a generally schematic cross-sectional view taken transversely through a centrifugal extractor having a plurality of honey charged supers in readiness for a honey recovery operation.

Referring initially more particularly to FIG. 1, there is shown a typical and preferred embodiment of the invention artificial honeycomb, designated generally 10, assembled lengthwise of a standard beehive super 11. The latter includes endwalls 12, 12 rigidly connected to sidewalls 13 and fully open on its upper and lower sides. Such supers are stacked one on top of another in known manner along with other hive components to form a complete beehive. The upper inner edge of each endwall 12 is rabbeted at 15 to provide a supporting ledge for lugs projecting from the upper corners of conventional wooden honeycomb frames. When supers 11 are converted to use with the present invention, rabbets 15 support a one-piece sheet metal spacer strip 16 having means now to be described holding combs 10, 10 uniformly spaced from one another.

Spacer strips 16, as here shown, are formed from a single strip of resilient sheet metal shaped to nest against rabbeting 15 along the inner rim edge of endwall 12. Each spacer includes an upright first flange 19 and a downwardly projecting channel-shaped second flange 20 interconnected by a horizontal web portion 21. The opposite ends of flange 19 are formed with tangs 23 having their lower edges sheared from the remainder of the strip and connected to the main body of the strip only along the hinge area 24. It will be understood that the outer end edges 25 of tangs 23 project sufficiently to have a forced interference fit between the interior surfaces of the super sidewalls 13, 13. This fact together with the resiliency of the tangs renders the tangs self-gripping and highly effective to lock the strips firmly assembled with flanges 19 and web 20 resting flush against the walls of rabbet 15. The strip is then moved toward its installed position as tangs 23 flex toward one another as necessary. As the strip reaches its installed position edges 25 bite into the sidewall 13 and firmly grip and retain the strip in place.

If it is desired to keep the strips permanently installed, some users may prefer to add tacks as indicated at 27 in FIG. 5. These tacks pass through openings in the dished or dimpled portions 28 of flange 20. These dimples are proportioned to seat against the super endwall when properly seated on rabbet 15 with the result that the dimples prevent overdriving the tacks 27 and deformation of flange 20. The overhang of the tack head facilitates withdrawal of the tack. An important feature of spacer strips 15 is the provision of any desired number and spacing of channels or grooves 30 having a loose sliding fit with the complementally shaped portion 31 protruding horizontally from either end of comb 10, this feature being best shown in FIG. 6.

Combs 10 forming an important feature of the present invention are preferably molded from high strength, plastic composition. The material is selected from various commercially available materials which will not warp or deform, particularly when heated to a sterilizing temperature.

The comb includes a continuous perimeter frame 33 (FIGS. 6, 7), having a width corresponding to the thickness of the comb as a whole as, for example, one half to nearly two inches. Each face comprises a multiplicity of small diameter wells 34 separated from one another at their inner ends by a common bottom wall 35. Desirably, but not necessarily, the wells 34 have a depth corresponding to the depth of natural honey cells although they may be substantially shallower if desired. Preferably the wells on the opposite sides of the comb converge upwardly toward the upper horizontal edge of the frame by a slight angle corresponding to the angle of inclination of natural comb cells. This prevents the deposited honey from escaping; otherwise and except for this feature, it has been found that the bees will not use the artificial comb or will do so only by extending the outer end of the well by adding wax inclined upwardly sufficiently to retain the honey. If the wells are of the proper depth and properly inclined upwardly it has been found that the bees will not extend the cell walls but will fill them with honey and then cap the outer ends as is indicated at 37.

An important feature of comb 10 is the provision at its upper corners of outwardly projecting lugs 40. These are proportioned to overlie and rest upon the web portion 21 of spacer strips 16. The top surfaces of lugs 40 lie substantially flush with the upper edges of the super and are positioned to be engaged by the jaws 54 of a centrifuge conventionally used to extract the honey. It is also pointed out and emphasized that the entire perimeter of the comb except for lugs 40 and tongues 31 is spaced from the juxtaposed surfaces of the super walls or of a super cover or another super as to provide bee passages of optimum size. This is important in permitting proper circulation of the bees to all areas of the hive and discourages burr combs. Opening outwardly through the vertical ends of each lug 40 is a V-shaped notch 41 (FIG. 3) for seating a suitable prying tool useful in loosening and elevating the combs from their installed position. Lugs 40 also preferably include a recess or a passage 42 by which the combs can be hung in sterilizing and drying equipment, etc. This recess is also useful in seating the jaws of tongs or other handling tool as will be described presently.

Hive tool 45 forming an important accessory of the invention is best shown in FIGS. 1, 2 and 3 as comprising a one-piece, U-shaped main body having tong legs 46, 46 interconnected by the bight portion 47. When used as a prying tool, the tong legs 46 serve as a handle while the tool is rocked counterclockwise as viewed in FIGS. 2 and 3 against the upper edge of the flange 16 with tabs 26 providing a broad area fulcrum. The bight portion has a sharp-edged extension 48 which may be used as a scraper and cleaning device. Not infrequently the combs become stuck to the spacer strip or to other parts of the super by wax. In this event, tool 45 is highly effective in freeing the comb following which the user depresses lugs 50 projecting inwardly from the inner surfaces of legs 46 into the opposite ends of openings 42 thereby firmly and positively gripping the comb without risk of contaminating either the comb or the honey if present.

Some beekeepers prefer to use a conventional hive tool well known to those skilled in this art and designated 45'. The tool is shown in FIG. 1 in use to pry a comb free if it is stuck to the spacer strip 16 by burr comb.

As will be readily recognized, lugs or tongues 31 projecting from the endwalls of the combs (FIG. 6) are sized to seat in the channels or grooves 30 of spacer strip 16. Although only one hive tool 45 is shown, it will be understood that the operator may carry a tool in each hand each usable as shown in FIG. 11 to manipulate an end of the comb.

After the combs are filled with honey, the supers are removed bodily to a processing plant. There the individual combs 10 may be removed from the supers but preferably the honey-charged supers are placed in hot rooms 53 (FIG. 8) where they are preheated until the wax caps 37 have softened. Alternatively the charged supers may be slid sidewise into the gripping jaws 54 at the outer ends of the centrifuge arms 55. This operation may be performed with the lug end 41 of the combs facing outwardly away from the axis of the centrifuge thereby avoiding the need for clamping the combs in the supers since the jaws 54 overlie lugs 40 and retain combs 10 firmly in place. The centrifuge is then rotated at an appropriate speed by driving motor 57 to expel the honey from the comb wells. If desired, the interior of the centrifuge and the charged supers are first preheated to soften the wax caps. Since this mode of softening the wax slows the extraction cycle, it is preferable to preheat the supers before loading the extractor.

The extraction having been completed, the supers are lifted from the centrifuge and processed in cleaning and sterilizing equipment before being returned to the hive.

While the particular method of recovering honey from artificial honeycombs herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. That method of collecting and recovering honey from bees which comprises: equipping the supers of a beehive with a plurality of closely spaced artificial honeycombs each having a multiplicity of preformed honey receiving cells opening through its opposite vertically disposed faces, removing the honey filled supers to a honey recovery station, preheating said supers and honeycomb to soften the beeswax caps of said preformed cells, and centrifuging said supers without removing the honeycombs from said supers thereby to extract the honey from said cells while leaving said preformed honey receiving cells intact.

2. That method defined in claim 1 characterized in the steps of centrifuging a plurality of said supers simultaneously to recover the honey from each of the honeycombs therein in the same centrifuging operation.

3. That method defined in claim 2 characterized in the steps of supporting said supers in a centrifuging apparatus with the tops of the supers lying generally parallel to the axis of the centrifugal apparatus and normal to a radial plane bisecting the respective supers.

4. That method defined in claim 1 characterized in the step of centrifuging said supers while supported with the top face thereof facing away from and generally parallel to the axis of rotation during centrifuging.

5. That method defined in claim 1 characterized in the step of locking said artificial honeycombs against displacement relative to the super while undergoing centrifuging.

* * * * *